United States Patent [19]
Lelevé

[11] Patent Number: 4,865,059
[45] Date of Patent: Sep. 12, 1989

[54] HEADLAMP WASHING DEVICE FOR A MOTOR VEHICLE HEADLAMP

[75] Inventor: Joël Lelevé, Epinay-sur-Seine, France

[73] Assignee: Cibie Projecteurs, Bobigny Cedex, France

[21] Appl. No.: 227,250

[22] Filed: Aug. 2, 1988

[30] Foreign Application Priority Data

Jun. 8, 1987 [FR] France ................................. 87 11204

[51] Int. Cl.4 ............................................... B08B 3/02
[52] U.S. Cl. .................................... 134/56 R; 134/184; 134/198; 239/284.2; 15/250 A
[58] Field of Search .......... 239/284.2; 15/103, 250 A, 15/250.02, 250 R, 250.13; 134/56 R, 58 R, 184, 198

[56] References Cited

U.S. PATENT DOCUMENTS 3,656,691  4/1972  Norstrand ..................... 15/250 A X
4,223,841  9/1980  Schaller et al. .................... 239/284.2

FOREIGN PATENT DOCUMENTS 2455294  5/1976  Fed. Rep. of Germany ... 239/284.2
2600379  7/1977  Fed. Rep. of Germany .
2853924  7/1980  Fed. Rep. of Germany ... 15/250 A
3047396A1 6/1982  Fed. Rep. of Germany .
2345219 10/1977  France .
1396508  6/1975  United Kingdom ............ 15/250 A
2026851A  2/1980  United Kingdom .

Primary Examiner—Frankie L. Stinson
Attorney, Agent, or Firm—Wenderoth, Lind & Ponack

[57] ABSTRACT

A device for washing the lens of a headlamp, in particular for a motor vehicle, includes a reservoir for washing liquid, a spray nozzle directed towards the lens, a pump disposed between the reservoir and the spray nozzle, and a control means for the pump to cause the washing liquid to be drawn from the reservoir and be delivered to the spray nozzle, thereby to create a jet of liquid impacting on the lens. The outlet orifice of the spray nozzle is shaped to deliver a substantially horizontal, lamellar jet of liquid, covering approximately the entire width of the lens. The pump and its control means are designed to vary the pressure of the liquid at the inlet of the spray nozzle in such a manner that the jet, by the combination of its initial velocity which varies and the force of gravity, executes a sweeping movement over the lens in the direction of its height.

10 Claims, 2 Drawing Sheets

HEADLAMP WASHING DEVICE FOR A MOTOR VEHICLE HEADLAMP

BACKGROUND OF THE INVENTION

1. Field of the Invention

The present invention relates generally to devices for washing the glass lenses or the like of headlamps of motor vehicles, by projecting a liquid thereon. The invention relates more particularly to a screen washing device comprising a spray unit having a nozzle directed towards the screen and a pump mounted between the reservoir and the spray unit and operated by a control device.

2. Description of the Related Art

Devices are already known, for example from French Pat. No. 2 372 057, in which the spray unit is designed to discharge a mist of fine droplets of liquid having the form of a cone or the like, the geometry of this discharge being such as to cover at all times the entire surface of the glass lens to be washed.

However, for a given rate of flow, such fine droplets have a very limited washing efficiency. While the dirt stains on the lens are correctly dissolved by the liquid, their removal therefrom is very poor. Moreover, the geometrical shape of the mist of droplets is highly sensitive to variations in the speed of the vehicle, so that the contours of the cone of droplets seldom correspond exactly to those of the lens.

Devices are also known for effecting the wiping of the lens surface to be cleaned.

For example, in French Pat. No. 2 222 856, the spray unit is conceived so as to allow the evolution within it of various hydrodynamic phenomena which lead either to a modification of the jet cross-section or to a change in its direction at the outlet, in which case it can cover the surface to be washed along either a sinusoidal or a spiral path. However, such a device requires a highly complex spray unit, correspondingly expensive to produce, and does not achieve uniformity of the kinetic energy of impact of the liquid over the whole area of the glass lens.

Finally, a spray unit is known from French Pat. No. 2 345 219 which is capable of generating a horizontal lamellar jet of liquid. Owing to an oscillating-turbulence phenomena within an inner chamber of the spray unit, at the outlet of the spray unit a sweeping action of the sheet of liquid over the entire height of the headlamp lens is obtained.

This type of device is disadvantageous in that the manner in which the sweeping is effected is incompatible with the desired homogenous distribution of washing energy in the direction of the width of the glass lens. To be more precise, the configuration defined at the outlet orifice of the spray unit does not allow the desired distribution other than approximately, and not for each particular height of the sheet of water.

Furthermore, the turbulence phenomena created within the spray unit to effect the sweeping action is the locus of an energy loss in the moving liquid which, for a given volume of liquid, contributes to a drop in the washing efficiency.

One object of the present invention is to remedy the drawbacks of prior techniques and to provide a screen-washing device in which the means for obtaining a sweep effect by the sheet of water confer to this sweep a more efficacious cleaning action. A subsidiary object of the invention is to supply a substantially uniform quantity of liquid to the whole of the surface of the glass lens to be washed.

SUMMARY OF THE INVENTION

With these objects in view, the present invention relates to a device for washing the lens of a headlamp, especially of a motor vehicle, of the type comprising a reservoir for the washing liquid, a spray nozzle directed towards the lens, a pump disposed between the reservoir and the spray nozzle and a means for actuating the pump to cause the washing liquid to be drawn from the reservoir and propelled towards the spray nozzle, to create in this manner a jet of liquid impacting on the lens. The outlet of the spray nozzle is configured to deliver a jet of liquid of lamellar shape and of essentially horizontal section covering the entire width of the glass lens, and the pump and its actuator means are designed to vary the pressure of the liquid at the inlet of the spray nozzle such that the jet, by the combination of its initial velocity which varies and gravity, effects a sweeping movement over the lens in the direction of its height.

The preferred embodiments of the device according to the invention are as follows.

In order to achieve a substantially uniform washing effect over the entire width of the lamellar jet, the jet has, in a predetermined direction, a height which increases with the distance of the lens from the spray nozzle and is inclined relative to said direction.

The height of the outlet orifice of the spray nozzle determines the thickness of the jet in each direction and the orifice has a horizontally elongated form, with a maximum height at its edges and a minimum height at its center.

The pump is a centrifugal pump driven by a direct-current electric motor, the delivery pressure of the pump being proportional to the intensity o the current passing through the motor.

The operating means is a power control circuit which generates in the electric motor a succession of current pulses.

Each pulse has a leading edge, a ceiling and a falling edge, the edges being relatively steep.

The duration of each pulse is of the order of 0.2 to 1 second.

Two succesive pulses are suitably separated by a time interval of the order of 2 to 4 seconds.

A wash cycle comprises 1 to 5 current pulses, which determines an identical number of sweeps of the glass lens by the lamellar jet of liquid.

A wash cycle of the lens may be triggered simultaneously with a wash cycle of the windscreen of the vehicle.

Other features and advantages of the present invention will be better understood from the following detailed description of a preferred embodiment of the invention.

DESCRIPTION OF THE PREFERRED EMBODIMENTS

Figure 1:
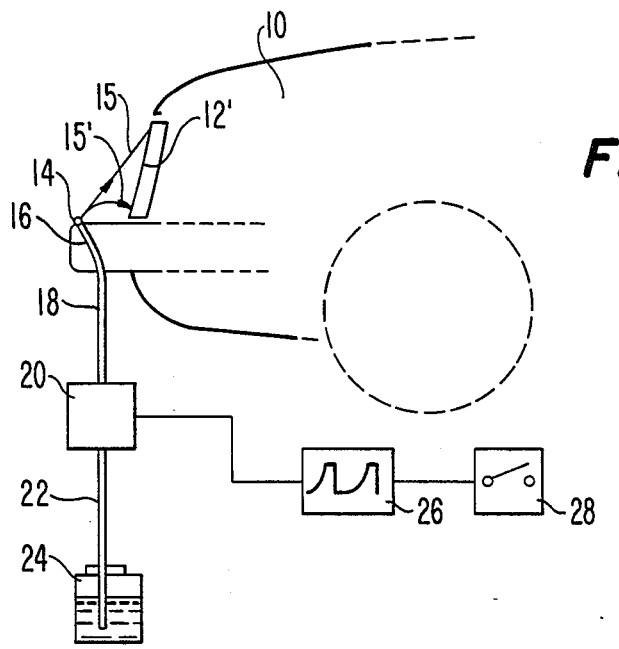
FIG. 1 is a general diagrammatic view of a lens-washing device according to the present invention.

FIG. 1 shows a lens-washing device comprising a reservoir 24 for washing liquid, for example detergent-containing water, a pump 20, the intake of which is connected to the reservoir 24 by a conduit 22, a spray nozzle 14 which is fed by the delivery outlet of the pump through a duct 18, and a time-calibrated electrical control device for the pump, generally referenced 26, controlled by a control switch 28 adapted for operation by the driver of the vehicle.

In the present example, the spray nozzle is disposed in front of and below the lens 12 of a front headlamp of a motor vehicle 10, and is preferably incorporated into the front bumper or fender of the vehicle, bearing the reference 16.

The pump 20 is a centrifugal pump of conventional type, which will not be described here in detail, driven by a direct-current electric motor.

The switch 28 which triggers the washing action can be associated with the control for the windscreen wiper of the vehicle, which causes a jet of liquid to be directed at the windscreen. In this manner, the operation of this single switch simultaneously triggers the projection of the washing liquid towards the windscreen and towards the headlamp lenses.

The control device 26, which controls the direct-current motor of pump 20, is a power control circuit acting according to a predetermined sequence, triggered by the switch 28, as will be seen later.

As can be seen in FIGS. 3 to 6, the spray nozzle 14 has a cylindrical body 141 traversed by an axial bore 142. At the outlet end of the spray nozzle, axial bore 142 terminates in a hemispherical wall 142a and opens into an outlet orifice or opening 143.

The opening 143 has a flattened form, a width which is substantially equal to that of the bore 142 and a height which is much smaller than such width. As will be seen in detail in the following, the opening 143 has a well-defined profile, which widens laterally outwards.

Figure 3:
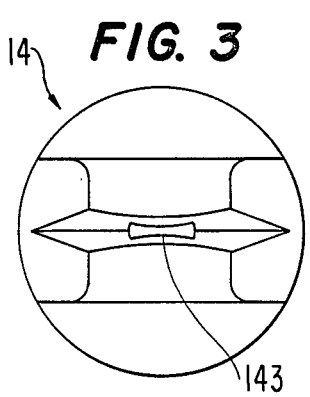
FIG. 3 is a front view of the spray nozzle of FIG. 2.
Figure 4:
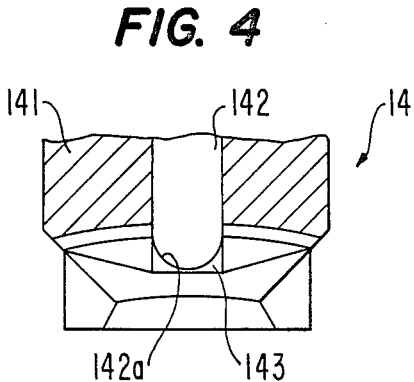
FIG. 4 is an axial horizontal section of the spray nozzle of FIG. 3.
Figure 5:
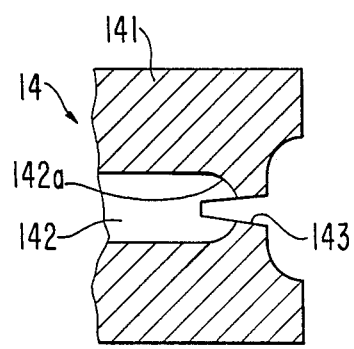
FIG. 5 is an axial vertical section of the spray nozzle of FIGS. 3 and 4.

The geometry of the spray nozzle is illustrated in the three views of FIGS. 3, 4 and 5.

Figure 2:
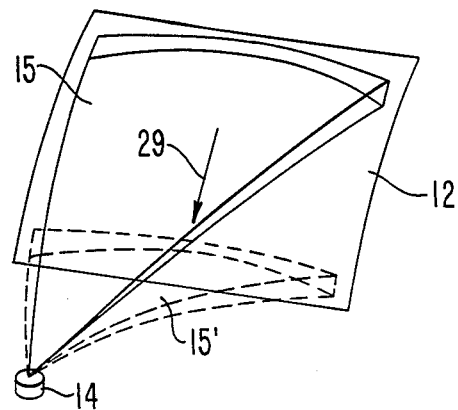
FIG. 2 is a perspective view in detail of a spray nozzle, of the lens and of the geometry of jet of washing liquid.

Referring now to FIG. 2, references 15 and 15' indicate lamellar jets of liquid which are generated by the spray nozzle 14 described above when it is fed with pressurized liquid.

As can be observed, each jet has a fan-shaped form of rectilinear horizontal section and, according to the present invention, its characterising feature is a greater height in the edge zones than at the center.

It has in fact been found that the utilization of a lamellar jet of uniform cross-section, known in the prior art, leads to a less efficient washing of the lateral edges of the glass lens. The reason for this is that, on the one hand, these zones are more remote from the spray nozzle and thus the velocity of the liquid impacting on these zones is as a matter of principle lower than at the center and, more importantly, that these zones have a substantial inclination relative to the direction of the liquid.

More precisely, whereas a central zone of the glass lens is substantially perpendicular to the direction of the jet at this location, and therefore the jet at such location is applied to a zone of the glass the surface which approximately equals the area of the jet at such location, lateral zone of the glass lens is, on the contrary, relatively inclined with respect to the plane perpendicular to the direction of the jet, so that a given quantity of liquid would have to effect the washing of a zone area, by comparison.

Superimposed on this phenomena is the circumstance whereby the edge regions of the glass are more remote from the spray nozzle than its central region. The consequence again is that the same quantity of water issuing at a particular angle from the spray nozzle will have to effect the washing of a zone the effective area of which increases with distance.

Therefore, according to one preferred feature of the invention, and as indicated above, the spray unit is designed to project larger quantities of water towards the edges of the glass pane.

In the embodiment shown in FIGS. 3 to 6, the orifice 143 of the spray nozzle has, with this end in view, a profile delimited by upper and lower faces, respectively referenced 144 and 145, which are convex and which, in the present example have a circular profile of radius R.

In a general manner, this profile will be adapted to the geometrical configuration of the spray nozzle and of the glass pane. In particular, the extent to which the orifice 143 widens towards the sides is determined by the ratio between the width of the headlamp lens and the distance of the spray nozzle from the lens in a frontal direction.

It is of course understood that the more or less curved shape of the lens can also influence this consideration.

Figure 7:
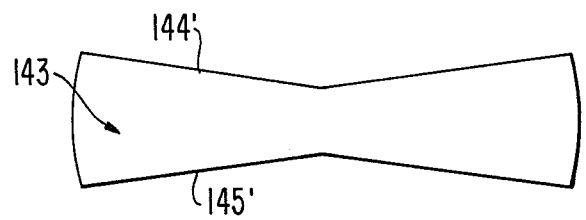
FIG. 7 is a detailed view illustrating the geometry of a modified spray nozzle.

In FIG. 7, a variant of the orifice 143 of the spray nozzle is shown. The profile of each of the upper and lower faces, 144' and 145', respectively, of the orifice is defined in this case by two rectilinear segments defining a V-shaped configuration and meeting in its center, as shown.

Figure 6:
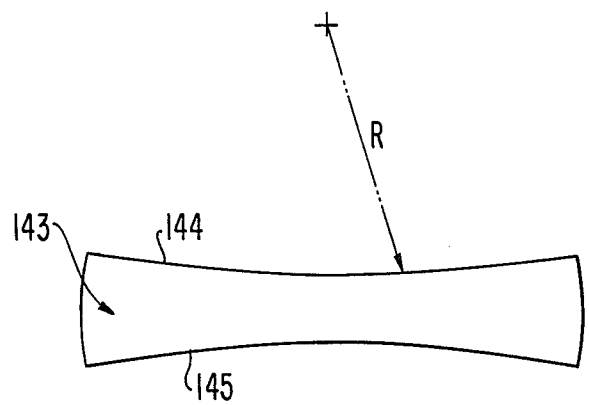
FIG. 6 is a detailed view illustrating the geometry of the spray nozzle.

Similar to the embodiment according to FIG. 6, the slopes of the rectilinear segments relative to the horizontal will be determined by the geometrical configuration of the spray nozzle/headlamp lens combination.

The centrifugal pump 20, associated with a direct current motor, is operated by the control unit 26 so as to deliver pulses of water at its output pressure. Moreover, in each pulse there comprises a phase during which the pressure varies. This pressure variation involves a variation of the initial velocity of the lamellar jet and, by a judicious selection of the minimum and maximum initial velocities, combined with the effect of gravity acting on the sheet of water, the sheet is caused to effect a vertical sweeping movement on the lens 12 of the headlamp. FIG. 2 shows the jet 15 corresponding to the maximum initial pressure and velocity; owing to this high velocity, the influence of the gravitational force is slight and the jet of liquid impacts on the region of the upper edge of the lens. As for the jet indicated at 15' it corresponds to the mimimum initial pressure and velocity; the effect of gravity is much more pronounced, so that the jet follows a more curved path and impacts on the region of the lower end of the lens.

It is important to note that the sweeping effect is obtained without movement of the spray nozzle and without any phenomena of oscillating turbulence or the like within the nozzle. More precisely, the initial direction of the jet is always the same. It follows therefrom that, on the one hand, energy losses in the trajectory of the liquid downstream of the pump are minimised and, on the other hand, the judicious distribution of the quantity of the liquid as a function of the zones to be cleaned is preserved irrespective of the delivery pressure of the pump, which determines the height of the jet. There is thus achieved a washing sweep effect of optimum efficiency and homogenity.

The functioning of the device is as follows, with reference to FIG. 8.

Figure 8:
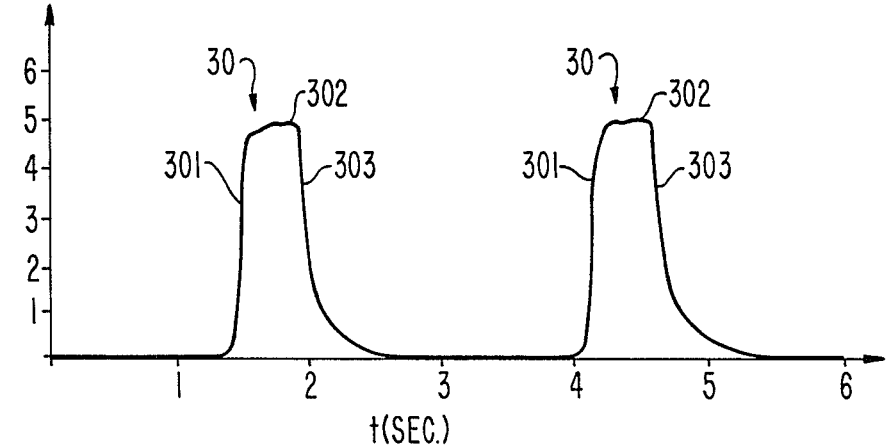
FIG. 8 is a pressure/time graph, illustrating the timing of the operation of the device.

Each voltage pulse which triggers a pressure pulse 30, as shown in FIG. 8, has first of all a leading edge 301 which is relatively steep, during which the jet is generated and which rises instantaneously to the position of maximum height (jet 15 in FIG. 2).

There then follows a steady pressure along a ceiling 302 during which the jet holds this position, whereafter the pressure diminishes in a trailing edge 303 which is also relatively steep but, owing to the inertia generated in the circulation of the water, the initial velocity of the jet falls more slowly and brings about a vertical sweep of the jet, in the direction of arrow 29 (FIG. 2) as far as the lower jet position 15'.

The delivery pressure of the pump is then stopped, and the jet disappears until the occurence of the next pulse.

In FIG. 8, the pulses have a width corresponding to approximately 0.5 seconds delivery and are spaced at approximately 2.7 seconds intervals; the delivery pressure of the pump varies between 0 and $5 \times 10^5$ pascals.

Those skilled in the art will have no difficulty in conceiving a power control circuit yielding the operational characteristics such as those described above or, as variants, any other appropriate sequencing.

In particular, such a circuit, supplied by the battery of the vehicle, shall comprise for example a logic circuit determining the desired pulse characteristics (width, spacing, peak value) and connected to the motor driving the pump over an amplifier stage.

Moreover, a pump control could be conceived operating not with substantially rectangular pulses, as shown, but for example, with an undulatory current with triangular, sawtooth or sinusoidal pulses.

Finally, although the utilization of a centrifugal pump associated with a direct-current motor is particularly advantageous owing to, firstly, a good linearity between the current passing through it and the torque delivered by the motor and, secondly, between this torque and the delivery pressure of the pump, it is quite obvious that other pumping devices could also be used.

The invention is not limited to the embodiments described in the foregoing and illustrated in the drawings, but includes any variant or modification within the scope of the appended claims.

What is claimed is:

1. A device for washing the lens of a headlamp, and said device comprising;
    a reservoir for washing liquid;
    an immovable spray nozzle to be directed towards the lens;
    a pump disclosed between said reservoir and said spray nozzle;
    pump control means for causing the washing liquid to be drawn from said reservoir and be delivered to said spray nozzle, thereby to create a jet of washing liquid impacting on the lens;
    said spray nozzle having an outlet orifice shaped to deliver the jet of liquid of a lamellar shape and of substantially horizontal section covering the entire width of the lens; and
    said pump and said pump control means comprising means for varying the liquid pressure at the inlet of said spray nozzle, in a manner such that the jet executes a sweeping movement, without movement of said spray nozzle, over the lens along the height thereof from the top thereof to the bottom thereof by the combination of the initial and changing velocity of the jet and by gravity.

2. A device according to claim 1 whereby in order to achieve a substantially uniform washing effect over the entire width of the lamellar jet, said jet has, in a given direction, a height which increases with the distance of the lens from said spray nozzle in said direction and inclined relative thereto.

3. A device according to claim 2, wherein the height of said outlet orifice of said spray nozzle determines the thickness of the jet in each direction and said orifice has a horizontally elongated shape, with a maximum height at its edges and a minimum height at its center.

4. A device according to claim 3, wherein said outlet orifice of said spray nozzle is delimited at the top and bottom thereof by two convex faces.

5. A device according to claim 3, wherein said outlet orifice of said spray nozzle is delimited at the top and bottom thereof by two faces of V-shaped profile.

6. A device according to claim 1, wherein said pump is a centrifugal pump driven by a direct-current electric motor, the delivery pressure of said pump being substantially proportional to the intensity of the current passing through said motor.

7. A device according to claim 6, wherein said control means comprises a power control circuit generating in said electric motor a succession of current pulses.

8. A device according to claim 7, wherein each said pulse has a leading edge, a ceiling and a trailing edge, said edges being relatively steep.

9. A device according to claim 7, wherein each said pulse has a duration of the order of 0.2 to 1 second, and two successive pulses are separated by a time interval of the order of 2 to 4 seconds.

10. A device according to claim 7, wherein a wash cycle comprises one to five current pulses which determine an identical number of sweeps of the lens by the lamellar jet of liquid.

* * * * *